United States Patent Office 3,296,277
Patented Jan. 3, 1967

3,296,277
SUBSTITUTED 3-CYANO-1-HYDROXY-2-PHENYLINDOLES
Francis J. Petracek, Canoga Park, Calif., assignor to Rexall Drug and Chemical Company, Los Angeles, Calif., a corporation of Delaware
No Drawing. Filed Aug. 26, 1964, Ser. No. 392,278
2 Claims. (Cl. 260—326.16)

This invention relates to compositions of matter classified in the art of chemistry as substituted indoles.

The invention sought to be patented in its product composition aspect may be described as residing in the concept of a 3-cyano-1-hydroxy-2-phenylindole in which the phenyl group at the 2-position of the indole nucleus bears a nitro or lower alkoxy substituent at either the ortho, meta or para position and to their hereinafter described equivalents.

The invention sought to be patented in its process aspect is described as residing in the concept of treating an inert solvent solution of a lower alkyl α-(o-nitrophenyl)cyanoacetate also bearing at the α-position a nitro or lower alkoxybenzyl group with an alkali metal carbonate, thereby to prepare the tangible embodiments of this invention.

As used throughout the specification and in the claims, the term "lower alkyl" embraces both straight and branched chain alkyl radicals containing from 1 to 6 carbon atoms, and the term "lower alkoxy" embraces straight and branched chain alkoxy radicals containing from 1 to 6 carbon atoms, for example, methoxy, ethoxy, isopropoxy, n-butoxy, tert-butoxy, n-hexyloxy and the like.

The tangible embodiments of this invention possess the inherent general physical characteristics of being solid crystalline materials. Elemental analysis, as well as ultraviolet and infra-red spectral data and nuclear magnetic resonance (NMR) data, taken together with the nature of the starting material and mode of synthesis, positively confirm the structure of the compounds sought to be patented.

The tangible embodiments of this invention possess the inherent applied use characteristics of having significant pharmacological activity as central nervous system depressant and adrenolytic agents as determined by recognized and accepted pharmacological test procedures. The tangible embodiments of this invention have also been shown to block the normal contractions of isolated guinea pig ileum induced by acetylocholine and serotonin.

The manner and process of making and using the invention will now be generally described so as to enable a person skilled in the art of chemistry to make and use the same as follows:

The starting materials for preparing the tangible embodiments of this invention are lower alkyl α-(o-nitrophenyl)-α-(nitro or lower-alkoxybenzyl)cyanoacetates or their hereinafter described equivalents which are conveniently prepared by the reaction of a nitro or loweralkoxybenzyl halide with a lower alkyl α-(o-nitrophenyl)cyanoacetate or its hereinafter described equivalents in the presence of an alkali metal lower alkoxide such as potassium tertiary butoxide and an inert solvent such as dimethylformamide.

Conversion of the starting material to the tangible embodiments of this invention is carried out as described in the following reaction sequence:

REACTION SEQUENCE

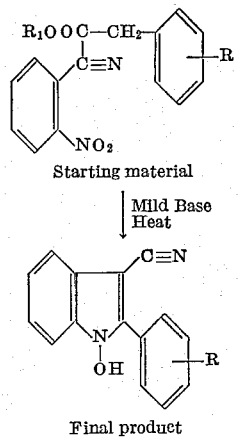

wherein $R_1$ is lower alkyl and R is lower alkoxy or nitro.

Starting materials in which the o-nitrophenyl group is further substituted with one or more halo, for example chloro, bromo or fluoro, lower alkyl or lower alkoxy groups are prepared as above described by the reaction of a nitro or lower-alkoxybenzyl halide with an appropriately substituted lower alkyl α-(o-nitrophenyl)cyanoacetate and are the full equivalents to starting materials bearing an otherwise unsubstituted o-nitrophenyl group in a reaction with a mild base, thereby to form substituted 1-hydroxy indoles bearing such substituents on the phenyl portion of the ring. Such substituted final products have the same utility as 3-cyano-1-hydroxy-2-(nitro or loweralkoxyphenyl)indoles and are included within the scope of the tangible embodiments of this invention.

In accordance with the above depicted reaction sequence the cyanoacetate starting material is converted to the tangible embodiments of this invention by heating with an alkali metal carbonate, for example potassium or sodium carbonate, in an inert solvent at a temperature of about 40 to about 90° C. Refluxing in methanol is a particularly desirable means of carrying out the reaction.

The tangible embodiments of this invention can be combined with conventional pharmaceutical diluents and carriers to form such dosage forms as tablets, suspensions, solutions, suppositories and the like.

The best mode contemplated by the inventor for carrying out his invention will now be set forth as follows:

*Example*

3-CYANO-1-HYDROXY-2-(o-NITROPHENYL)INDOLE

Ethyl α-(o-nitrophenyl)-α-(o-nitrobenzyl)cyanoacetate (37 g., 0.1 mole) is mixed with hot methanol (400 mls.). With stirring is then added 1 M. potassium carbonate solution (100 ml.) over a period of about 5 minutes. The mixture is then heated and stirred under reflux conditions on a steam bath for about one hour. The solution is allowed to cool and then to it is added water (100 ml.). The resulting solution is then extracted six times with chloroform (100 ml. portions). The aqueous solution remaining is acidified with hydrochloric acid to yield a crop of crystals that are recrystallized from 95% ethanol, M.P. 204–208° C.

*Analysis.*—Calculated for $C_{15}H_9O_3N_3$: C, 64.51%; H, 3.25%; N, 15.05%. Found: C, 64.93%; H, 3.09%; N, 15.29%.

In like manner ethyl α-(o-nitrophenyl)-α-(p-methoxybenzyl)cyanoacetate is treated to yield 3-cyano-1-hydroxy-2-(p-methoxyphenyl)indole, M.P. 197–199° C.

*Analysis.*—Calculated for $C_{16}H_{12}O_2N_2$: C, 72.71%; H, 4.58%; O, 12.11%; N, 10.60%. Found: C, 72.12%; H, 4.42%; O, 12.07%; N, 10.31%.

The subject matter which the applicant regards as his invention is particularly pointed out and distinctly claimed as follows:

1. 3-cyano-1-hydroxy-2-(nitrophenyl)indole.
2. 3-cyano-1-hydroxy-2-(o-nitrophenyl)indole.

References Cited by the Examiner
UNITED STATES PATENTS 3,076,814 2/1963 Speeter et al. _____ 260—319

OTHER REFERENCES

Loudon et al., Jour. Chem. Soc., 1960, pages 3466–3470.

ALEX MAZEL, *Primary Examiner.*

HENRY R. JILES, *Examiner.*

MARY U. O'BRIEN, *Assistant Examiner.*